(No Model.)

G. HOYER.
PIPE JOINT.

No. 604,863. Patented May 31, 1898.

Witnesses
F. Mattner
S. Williamson

Inventor
Gustav Hoyer
By Geo. H. Holgate
Atty

UNITED STATES PATENT OFFICE.

GUSTAV HOYER, OF SCHÖNEBECK, GERMANY, ASSIGNOR TO THE FAHRRAD-WERKE WELTRAD, VORMALS HOYER & GLAHN, OF SAME PLACE.

PIPE-JOINT.

SPECIFICATION forming part of Letters Patent No. 604,863, dated May 31, 1898.

Application filed August 13, 1897. Serial No. 648,112. (No model.)

*To all whom it may concern:*

Be it known that I, GUSTAV HOYER, a subject of the King of Prussia, Emperor of Germany, residing at Schönebeck-on-the-Elbe, in the Kingdom of Prussia, German Empire, have invented an Improvement in Pipe-Joints, of which the following is a specification.

My invention relates to a new and useful improvement in pipe-joints, and has for its object to improve upon the construction shown in my former application for United States Letters Patent filed January 23, 1896, and bearing serial number 576,505.

In practice it has been found that there is a tendency to fracture the inner section of the joint when expanded outward to fill the concave recesses or grooves in the outer pipe, and this I entirely overcome and render the joint more rigid by placing a reinforce-section within the inner pipe.

In order that those skilled in the art to which this invention appertains may understand how to make and use the same, the construction and operation will now be described in detail, referring to the accompanying drawings, forming a part of this specification, in which—

Figure 1:
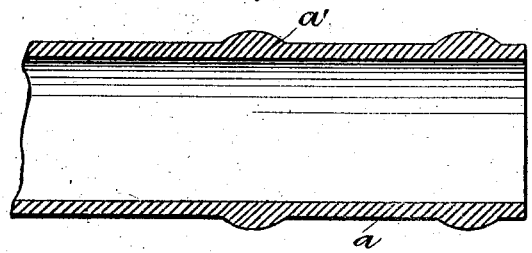
Figure 2:
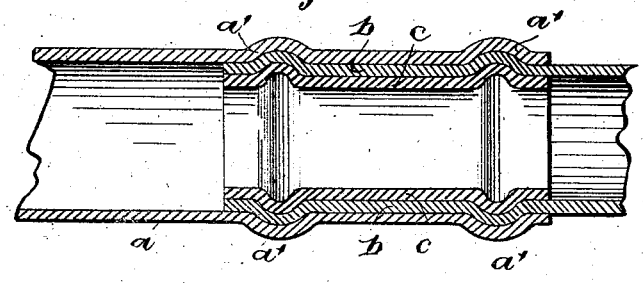

Figure 1 is a section of a portion of the cast pipe prior to the boring out of the grooves, and Fig. 2 a section of a joint made in accordance with my present improvement.

In carrying out my invention as herein embodied I form upon the section $a$ the annular enlargements $a'$, and these enlargements in the case of a cast pipe are formed thereon in the molding, and annular grooves are then bored therein from the interior of the pipe-section, and when this pipe is made otherwise than by casting the enlargements may be formed by expanding the pipe outward, thereby at the same time forming the annular internal grooves.

The end of the section $b$ is passed within the section $a$ and a reinforce-section $c$ placed within the inner end of the section $b$, when a suitable tool, such as that shown in the above-referred-to application, is inserted within the joint and so operated as to expand both the reinforce-section and the section $b$ and cause certain portions thereof to fit snugly within the grooves of the enlargements $a'$, as clearly shown in Fig. 2. When this has been accomplished, it is obvious that a perfect joint is formed and that the sections $a$ and $b$ cannot be withdrawn from each other, and the action of the reinforce will be to strengthen the joint, so as to render it as strong, if not more so, than any other portion of the pipe.

The prime function of the reinforce is to avoid the cramping or fracturing of the section $b$ at the points where it is expanded outward into the annular grooves in the section $a$, since by the use of this reinforce the expanding-tool will come in contact therewith and not in contact with the section $b$, thus avoiding the difficulty above mentioned.

Having thus fully described my invention, what I claim as new and useful is—

In a pipe-joint, an outer section having shallow annular grooves formed near the end thereof, an inner section fitting within the outer section and a reinforcing-section of uniform thickness throughout, said reinforcing-section being permanently fitted in the inner section, said inner and reinforcing sections being simultaneously pressed outward or expanded into the grooves of the outer section and at those points only, the flange produced by the groove in the reinforcing-section being deeper in proportion than the other section, substantially as set forth.

In testimony whereof I hereunto set my hand in presence of two witnesses.

GUSTAV HOYER.

Witnesses:
W. HAUPT,
HENRY HASPER.